(12) United States Patent
Neves (10) Patent No.: US 11,086,707 B2
(45) Date of Patent: Aug. 10, 2021

(54) IMAGE-BASED DETECTION OF ERRORS IN APPLICATION STATE

(71) Applicant: salesforce.com, inc., San Francisco, CA (US)

(72) Inventor: João Henrique Pimentel Wanderley Neves, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 49 days.

(21) Appl. No.: 16/682,954

(22) Filed: Nov. 13, 2019

(65) Prior Publication Data

US 2021/0141684 A1 May 13, 2021

(51) Int. Cl.
*G06F 11/07* (2006.01)
*G06F 11/30* (2006.01)

(52) U.S. Cl.
CPC ........ *G06F 11/0778* (2013.01); *G06F 11/079* (2013.01); *G06F 11/0751* (2013.01); *G06F 11/3086* (2013.01)

(58) Field of Classification Search
CPC ............. G06F 11/0778; G06F 11/0751; G06F 11/079; G06F 11/3086
See application file for complete search history.

(56) References Cited

U.S. PATENT DOCUMENTS

| 9,213,625 | B1 * | 12/2015 | Schrage | G06F 11/3692 |
| 2016/0373883 | A1 * | 12/2016 | Hamilton | H04L 67/025 |
| 2019/0384699 | A1 * | 12/2019 | Arbon | G06N 3/006 |

OTHER PUBLICATIONS

Apple Inc., "Creating an Image Classifier Model," Date Unknown, nine pages, [Online] [Retrieved on Jan. 16, 2020] Retrieved from the Internet <URL: https://developer.apple.com/documentation/createml/creating_an_image_classifier_model#see-also>.

Apple Inc., "MLImageClassifier," Date Unknown, three pages, [Online] [Retrieved on Jan. 16, 2020] Retrieved from the Internet <URL: https://developer.apple.com/documentation/createml/mlimageclassifier>.

* cited by examiner

*Primary Examiner* — Nadeem Iqbal
(74) *Attorney, Agent, or Firm* — Fenwick & West LLP (57) ABSTRACT

Systems and methods are disclosed herein for using screen shots of an application to evaluate whether the application is in a fault state. In an embodiment, a processor captures screen shots of a screen of an application during operation of the application. The processor applies a classifier to the captured screen shots, and determines, from output of the classifier, a state of the application. The processor evaluates whether the determined state is a fault state of the application. Responsive to determining that the determined state is a fault state of the application, the processor prompts a user with an alert indicating the fault state and a corresponding point during the operation that exhibited the fault state.

18 Claims, 8 Drawing Sheets

| | Output 1 | Output 2 | Output 3 | Output 4 |
|---|---|---|---|---|
| Content | 10% | 20% | 0% | 40% |
| Loading | 80% | 70% | 100% | 20% |
| Blank | 10% | 10% | 0% | 40% |

Columns 410A, 420A, 430A (Loading State); 440A (Outlier)

| | Output 1 | Output 2 | Output 3 | Output 4 | Output 5 | Output 6 |
|---|---|---|---|---|---|---|
| Content | 10% | 20% | 0% | 40% | 70% | 100% |
| Loading | 80% | 70% | 100% | 20% | 20% | 0% |
| Blank | 10% | 10% | 0% | 40% | 10% | 0% |

Columns 410B, 420B, 430B (Loading State); 440B, 450B, 460B (Content State)

IMAGE-BASED DETECTION OF ERRORS IN APPLICATION STATE

TECHNICAL FIELD

This disclosure relates generally to determining whether an application is in a fault state by applying a classifier to screen shots of a screen of the application.

DESCRIPTION OF THE RELATED ART

A host system that embeds a client application does not have visibility into the source code of the client application. This is because the client application is operated by native code of a client device, and the native code is not accessible by the host system. Accordingly, the host system is not able to detect whether the client application is experiencing a problem, such as being hung on a loading screen. The inability to detect such problems in the operation of a client application leads to frustration by users of the client application, and also clouds the ability of the host system to identify and correct the source the problems. For example, without a mechanism for detecting that a problem occurred at a certain time in certain conditions, it is impractical to identify the cause of the problem (e.g., source code that may have introduced a bug that causes the problem months ago, the source code now being buried under a million lines of new code).

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
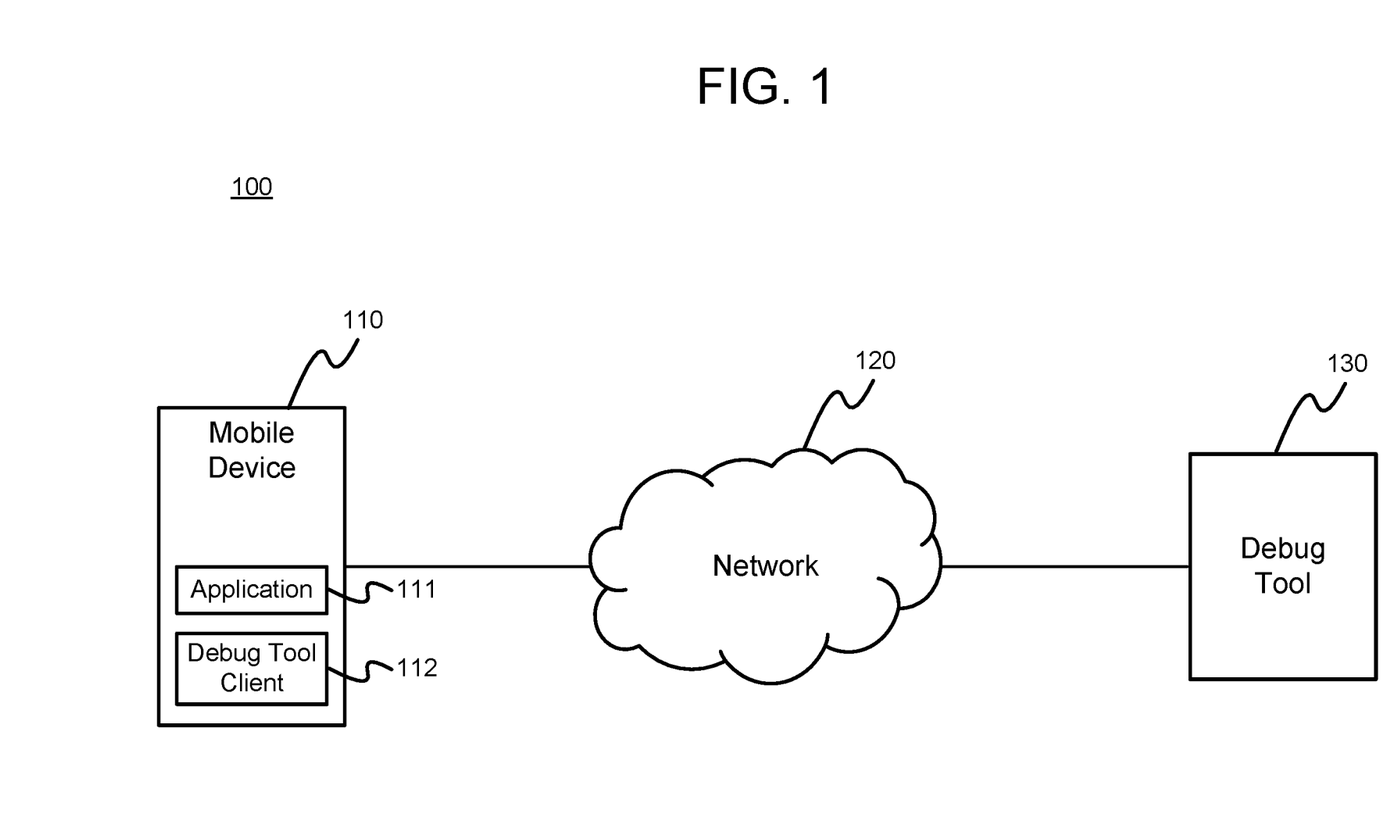
FIG. 1 is a system diagram showing an exemplary network environment for implementing a debug tool, in accordance with one embodiment.

Systems and methods are disclosed herein for automatically classifying the state of an application on a periodic basis (e.g., once per second) based on screen shots taken of the application during each period. Screenshots are used because the underlying code of the application is inaccessible. The classifications may be indicative of normal application health (e.g., where text renders properly), or of a problem (e.g., where a loading icon is present for a long period of time). An alert may be output to a user where a classification is indicative of poor application health FIG. 1 is a system diagram showing an exemplary network environment for implementing a debug tool, in accordance with one embodiment. System 100 includes mobile device 110, network 120, and debug tool 130. Mobile device 110 may be any client device that can be carried by a human being, such as a smartphone, a tablet computer, a laptop, or any other such client device. Mobile device 110 runs application 111. Application 111 may be an embedded application; for example, a host application may run on mobile device 111, and the host application may execute the embedded application. In such a scenario, the host application may be unable to access the source code of the embedded application for instrumentation. Accordingly, in order to identify problems with application 111, debug tool client 112 may run on mobile device 110. Debug tool client 112 may be built into the host application, or may be a stand-alone application.

Debug tool client 112 captures screen shots of a screen (e.g., window) of application 111 during its operation. Debug tool client 112 may capture the screen shots at predetermined times, which may be periodic or non-periodic. The predetermined times may be default, as programmed or instructed by debug tool 130, or may be customized by a user of debug tool 130 or a user of mobile device 110. Debug tool client 112 may obtain parameters of client device 110 each time a screen shot is captured. For example, debug tool client 112 may capture computer resource usage, network connection type, network connection strength, battery life, and any other parameter that describes a resource of mobile device 110. Debug tool client 112 may transmit the screen shots and the parameters to debug tool 130. In an embodiment, debug tool 130 is a server that is accessible to mobile device 110 by way of network 120. Alternatively, some or all modules of debug tool 130 may be a sub-component of debug tool client 112, and may be installed on, and execute at, mobile device 110. Network 120 may be any data network, such as a local network or the Internet.

Debug tool 130 applies a classifier to the captured screen shots, and determines, from output of the classifier, a state of application 111. States will be described with respect to FIGS. 2A and 2B below. Debug tool 130 evaluates whether the determined state is a fault state of application 111. Where the determined state is in fact a fault state of the application, debug tool 130 prompts may prompt a user with an alert indicating the fault state. The alert may indicate a corresponding point during the operation that exhibited the fault state. The term fault state, as used herein, refers to a state of the application that does not occur during normal operation.

Figure 2A:
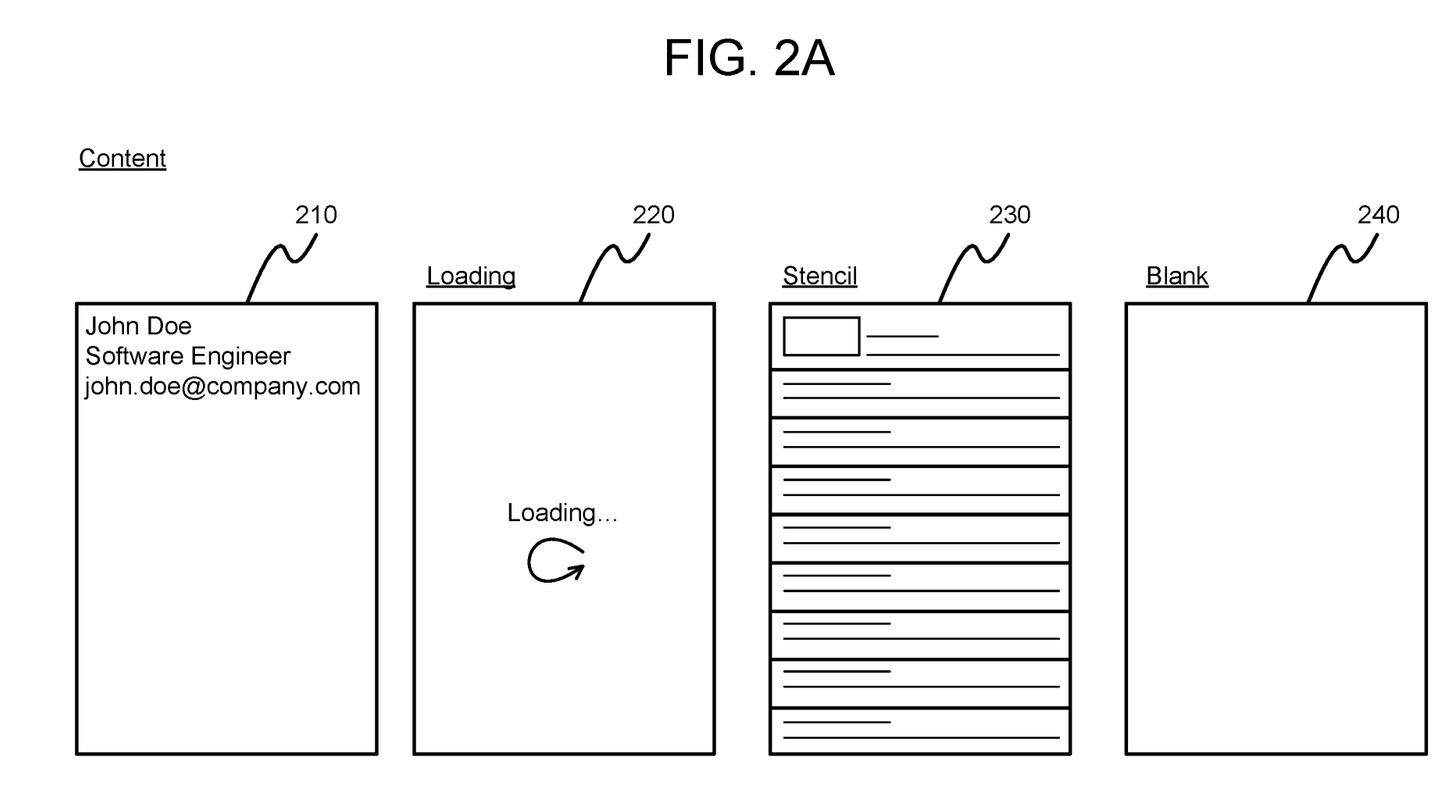
FIG. 2A includes a depiction of various application states, in accordance with one embodiment.

FIG. 2A includes a depiction of various application states, in accordance with one embodiment. FIG. 2A depicts application 111 in various states including content state 210, loading state 220, stencil state 230, and blank state 240. Content state 210 is a state where application 111 is depicting requested content. Typically, content state 210 reflects normal operation of application 111, where content is requested and responsively displayed by application 111.

Loading state 220 is a state where application 111 is indicating that it is loading content. As will be discussed further below with respect to FIG. 2B, loading state 220 may or may not, when detected, cause debug tool client 112 to detect a fault state of application 111, in that a loading operation may be normal for some content (e.g., high resolution content) or in some conditions (e.g., poor network connectivity of client device 111). Similarly, stencil state 230 may also indicate that application 111 is loading content, first loading a stencil for the content, and then populating the stencil itself. Blank state 240 occurs where a screen of application 111 is blank, which may occur as part of operation (e.g., a blank frame when transitioning to a new frame), or which application 111 may detect is associated with a fault state.

Application 111 may include one or more classifiers that are used to output information that debug tool 130 may use to determine a state of application 111. Details of the output information may include a probability that the application is in each given state. The output information will be described in further detail with respect to FIGS. 3, 4A, and 4B below. Classifiers may be machine learning models that are trained to output the information. In an embodiment, the classifiers may be generic in the sense that the classifiers are trained to detect states across different applications. For example, loading screens, stencil screens, and blank screens occur in many applications, and despite there being design difference across those applications for these sorts of screens, a classifier may be trained to accurately output information that can be used by debug tool 130 to determine the state of a given application due to commonalities across the applications. In an embodiment, some or all of the classifiers may be specific to application 111, where the one or more classifiers are trained by an administrator of application 111 to output information used to determine a state of application 111. The advantage of using application-specific classifiers is that their output will be more accurate, in that the training data is specific to application 111.

Regardless of whether generic or specific classifiers are used, the classifiers are trained using training data. The training data includes images that are manually labeled by users (e.g., the administrator or others). For example, screen shots of application 111 are reviewed by human classifiers, who tag each of the screen shots with a label (e.g., a label of "stencils state"). A machine learning model may generate variations of seed screen shots labeled by human classifiers with minor differences, and may also label that data with the same label used in the seed screen shot, to supplement the training data. After sufficient training data is collected, the classifiers are trained to detect images and apply an appropriate label. States of content, stencil, loading, and blank are merely exemplary; an administrator may train a classifier to detect a state corresponding to any given label.

Figure 2B:
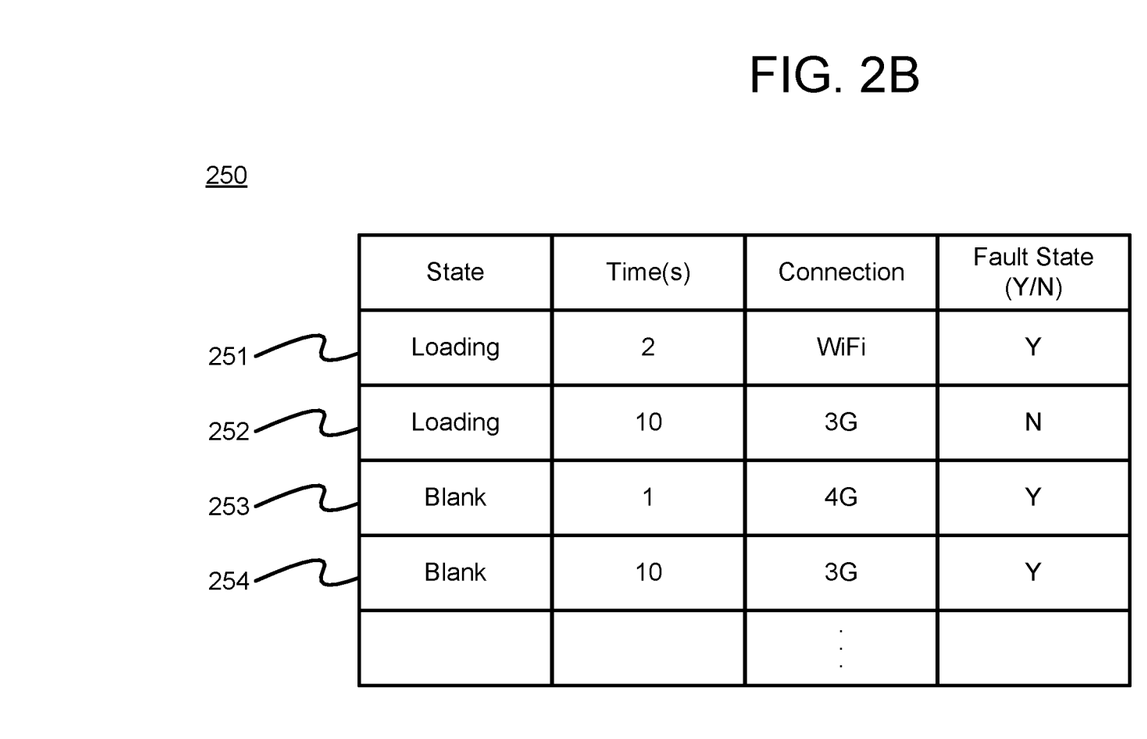
FIG. 2B is an example mapping table for mapping application states to fault states, in accordance with one embodiment.

FIG. 2B is an example mapping table for mapping application states to fault states, in accordance with one embodiment. As was mentioned with reference to FIG. 2A, the mere detection of a given state of application 111 does not necessarily mean that application 111 is, or is not, in a fault state. Data structure 250 depicts exemplary mappings of application states, along with other parameters. The term parameter, as used herein, refers to a fact about application 111 or client device 110. Exemplary parameters include a length of time an application state has been present; a length of time application 111 has been running, the activities application 111 has been commanded to perform; a network connection type of client device 110; a network connection strength of client device 110; a last reset time of client device 110; processor usage of client device 110, etc. Data structure 250 maps the application states to a determination of whether application 111 is in a fault state based on parameters.

As depicted in row 251, a loading state that lasts for two seconds over a strong connection, like a WiFi connection, is indicative of a fault state. This may be because application 111 typically loads in under two seconds where a WiFi connection is used. This is distinguished from row 252, where a loading state that lasts ten seconds is not indicative of a fault state where the connection is a 3G connection, which may be the case because it typically takes more than ten seconds to load a screen of application 111 when using a 3G connection. A similar example appears in rows 253, where it is shown that a fault state may be detected where a blank screen is detected for one second when there is a strong 4G connection in place, as within one second, at least stencils or a loading screen typically populate, rather than having only a blank screen over that period of time. Similarly, as shown in row 254, a blank screen that is present for ten seconds over a 3G connection may indicate a fault state, even though a loading screen for the same length of time using the same connection may not indicate a fault state, since a blank screen typically transitions to a loading or stencil screen within ten seconds.

While screen time and connection type are depicted in data structure 250, these are merely exemplary. Any parameter of client device 250 may be used to determine whether an application is in a fault state. In an embodiment, data structure 250 is populated by an administrator. In another embodiment, data structure 250 is populated by feeding application states and device parameters through heuristics generated by the administrator. In another embodiment, data structure 250 is generated by a machine learning model. The training data for such a machine learning model may include manually or automatically labeled sets of application states and corresponding parameters of client device 110 and/or application 111, from which the machine learning model may learn which combinations of application states and parameters correspond to a fault state.

Figure 3:
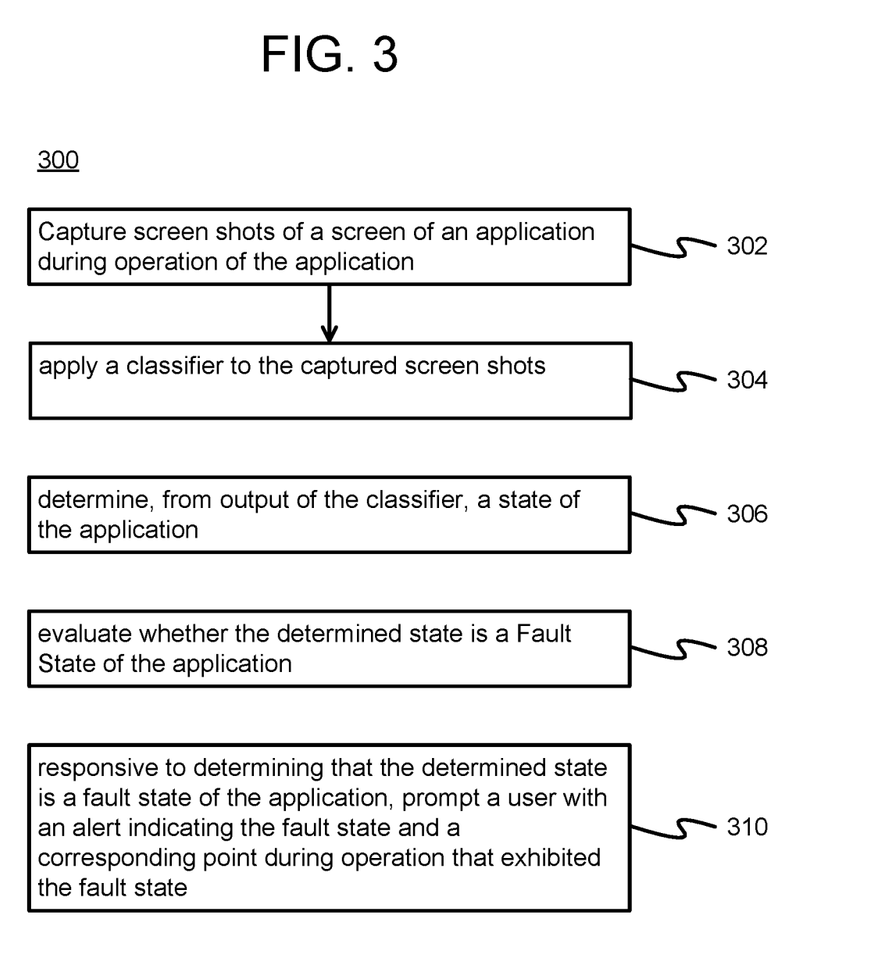
FIG. 3 is a flow diagram for determining whether an application is in a fault state, and prompting a user with an alert, in accordance with one embodiment.

FIG. 3 is a flow diagram for determining whether an application is in a fault state, and prompting a user with an alert, in accordance with one embodiment. Process 300 begins with debug tool client 112 capturing 302 screen shots of a screen of application 111 during operation of application 111. The screen shots are captured in accordance with the description provided above with respect to FIG. 1. Debug tool client 112 provides the screen shots to debug tool 130 (e.g., over network 120 where debug tool 130 is provided on a server, or provided within device 110 where debug tool 130 is instantiated within client device 110). Debug tool 130 applies 304 a classifier to the captured screen shots. Debug tool 130 determines 306, from output of the classifier, a state of the application. The output of the classifier, and the manner in which debug tool 130 determines the state of the application, is described in further detail below with respect to FIG. 4A, FIG. 4B, and FIG. 5.

Debug tool 130 evaluates 308 whether the determined state is a fault state (e.g., using data structure 250), as described with respect to FIG. 2B. Responsive to determining that the determined state is a fault state of the application, debug tool 130 prompts a user with an alert indicating the fault state and a corresponding point during operation that exhibited the fault state. Alerts are described in further detail with respect to FIG. 6.

Figure 4A:
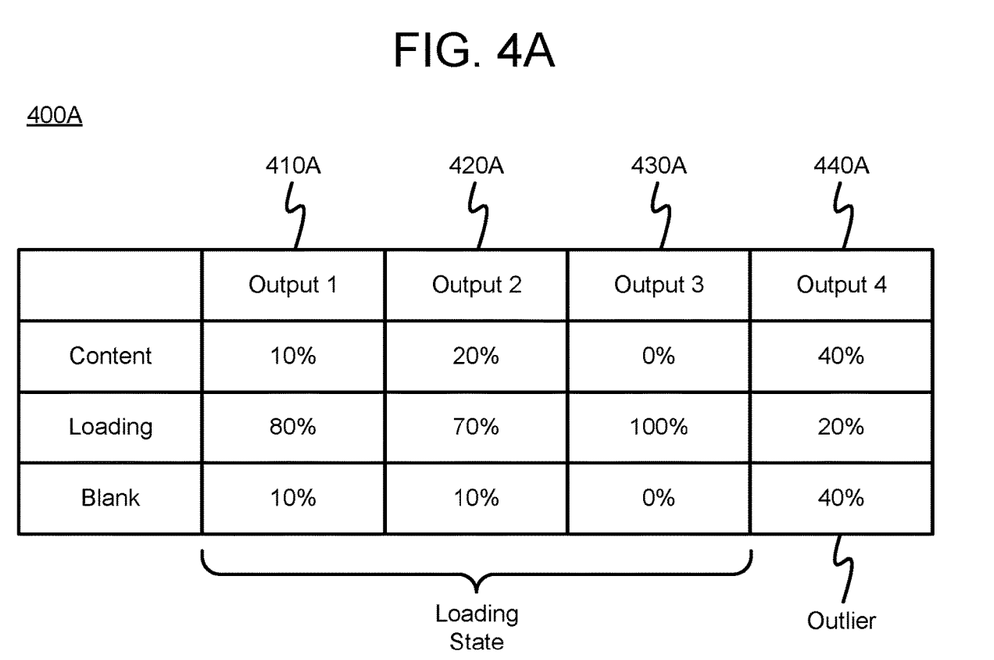
FIGS. 4A-4B include example classifications for use in determining application state, in accordance with one embodiment.
Figure 4B:
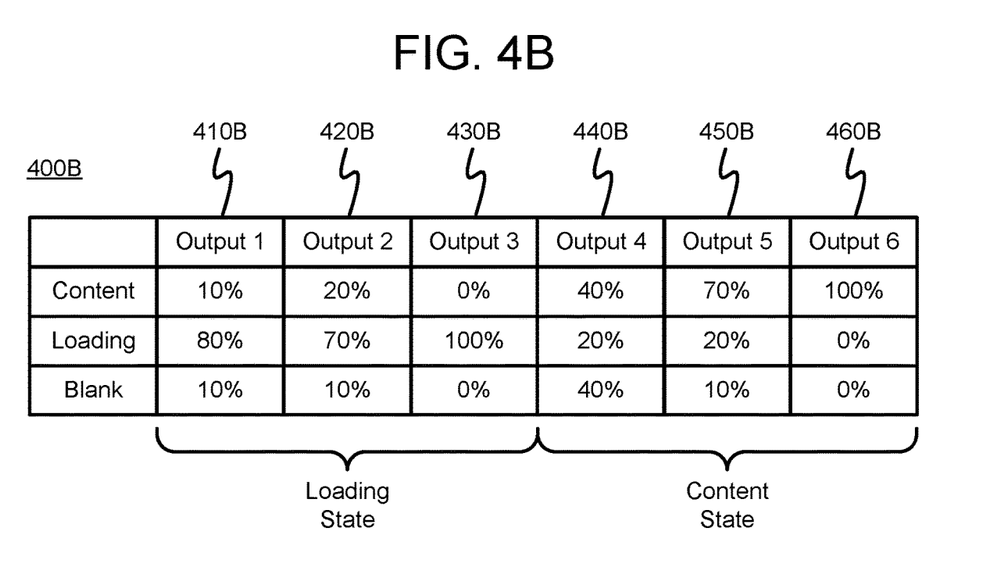

FIGS. 4A-4B include example classifications for use in determining application state, in accordance with one embodiment. FIG. 4A depicts data structure 400A, which is an exemplary depiction of output from the classifier, given input of screen shots. Output 410A depicts output of the classifier for a first screen shot, output 420A depicts output of the classifier for a second screen shot, output 430A depicts output of the classifier for a third screen shot, and output 440A depicts output of the classifier for a fourth screen shot. The first through fourth screen shots may be sequential, but need not be consecutive (e.g., every other or every third screen shot may be input into the classifier). As depicted, the output of the classifier is a probability that application 211 is in a state based on the screen shot input into the classifier. For example, output 410A shows that the screen shot is 10% likely to correspond to a content state, 80% likely to correspond to a loading state, and 10% likely to correspond to a blank state.

Output of the classifier is not necessarily a probability that application 211 is in a given state; this is merely exemplary, and other outputs may be used. In an embodiment, the classifier may directly output a state that application is in (e.g., by using the highest probability state). In such an embodiment, debug tool 130 may evaluate application state determinations in real time, updating or logging the application state each time a screen shot is input into the classifier. The classifier may output that the state is unknown where no potential state has a corresponding probability higher than a threshold (e.g., over 50%). The threshold may be set by the administrator, or may be a default percentage. Moreover, the classifier need not output a probability for every possible state; in an embodiment, the classifier may output a probability for one possible state (e.g., using a separate classifier to determine a probability for each possible state, and refraining from outputting probabilities for states whose probabilities are below a threshold (e.g., below 50%)).

In an embodiment, debug tool 130 determines a state of application 111 based on a plurality of outputs from the classifier, each output corresponding to a different screen shot. Each of outputs 410A, 420A, and 430A are determined by debug tool 130 to correspond to a loading state, due to a loading state having a probability above a threshold (e.g., a threshold set to 50%, where outputs 410A, 420A, and 430A show a probability of a loading state of 80%, 70%, and 100% respectively). Debug tool 130 may determine, based on a threshold number of sequential screen shots having a high probability of a certain state (e.g., the threshold being three screen shots), that application 111 was in that particular state at the time those screen shots were captured.

Debug tool 130 may determine that output 440A is an outlier. Debug tool 130 may make this determination based on output 440A deviating beyond a threshold amount from the output from sequential screen shots preceding output 440. For example, where the preceding screen shots yielded an output with a high probability of a loading state, and output 440A shows a low probability (e.g., 20%) of a loading state, it is likely that output 440A is an errant or defective screen shot, and should thus be discarded by debug tool 130 in determining the state of application 111.

There are times where debug tool 130 may encounter an output that deviates from prior outputs of the classifier, but may nonetheless determine that the deviating output is not an outlier. FIG. 4B depicts data structure 400B, which includes outputs 410B, 420B, 430B, and 440B that mirror their counterparts in FIG. 4A. However, data structure 400B also includes outputs 450B and 460B for sequential screen shots that come after the screen shot yielding output 440B. Debug tool 130 may determine, from the consecutive outputs 440B, 450B, and 460C, that application 111 has transitioned from a loading state to a content state.

Debug tool 130 may determine whether output from the classifier that deviates from immediately prior outputs is an outlier, or indicates a new state or a transition to a new state, based on heuristics defined by an administrator, or by feeding the outputs to a machine learning model. The administrator may define rules, such as threshold changes in probabilities from sequential outputs, as being indicative of outliers and changes in states. If a machine learning model is used, the machine learning model may be trained using training data including probabilities of different states across multiple sequential outputs, which may be labeled (e.g., by a human classifier) as being an outlier or a transition from one state to another.

Figure 5:
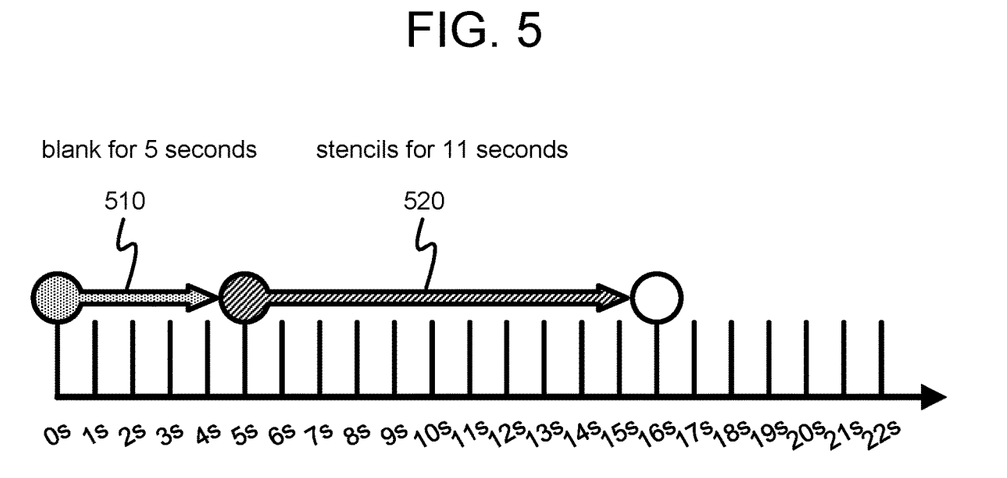
FIG. 5 depicts a timeline of application states over a short period of time that may be used to determine whether an application is in a fault state, in accordance with one embodiment.

FIG. 5 depicts a timeline of application states over a short period of time that may be used to determine whether an application is in a fault state, in accordance with one embodiment. As was briefly described with respect to FIGS. 2A and 2B, debug tool determining that application 111 is not necessarily sufficient for debug tool 130 to determine whether application 111 is in a fault state. Rather, debug tool 130 may utilize information about how long application 111 was in a given state. Following from the blank, stencils, content example used throughout this specification, a normal progression when a page of application 111 is requested may be to first show a blank screen, then stencils, and then loaded content. As screen shots are taken (e.g., once a second), debug tool 130 may evaluate, using output of a classifier, what state application 111 is in over a period of time (e.g., in the manner described with respect to FIGS. 4A and 4B). For example, debug tool 130 may determine that application 111 was in a blank state for five seconds, and then in stencils state 520 for 11 seconds. Debug tool 130 may apply heuristics or a machine learning model, as described above, to determine whether the sequence of states, and the length of times of the states, map to a fault state. Debug tool 130 may consider other parameters of client device 130 or application 111 in performing this evaluation.

Figure 6:
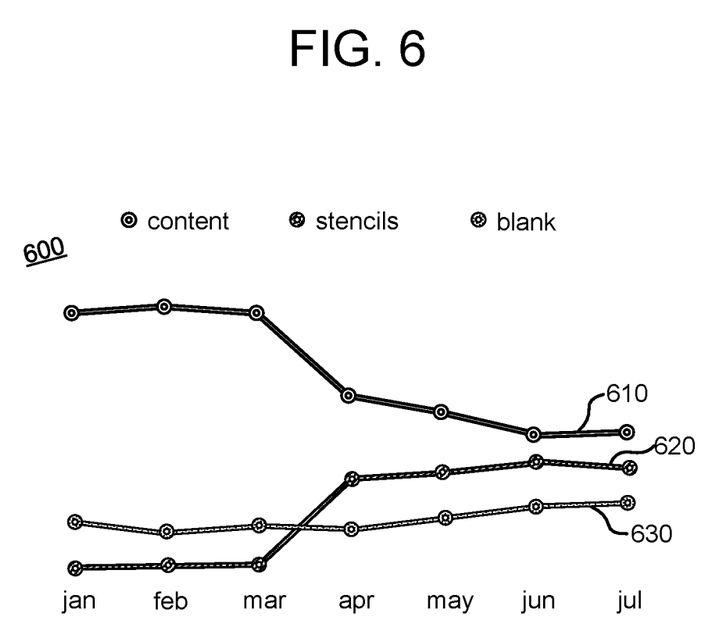
FIG. 6 depicts a timeline for tracking state over a long period of time, in accordance with one embodiment.

FIG. 6 depicts a timeline for tracking state over a long period of time, in accordance with one embodiment. Graph 600 depicts, for each of different states a timeline showing a frequency at each time along the timeline debug tool 130 detected a given state. Content state trend line 610 shows, over time, the frequency that a content state was detected by debug tool 130 in application 111. Blank state trend line 620 shows, over time, the frequency that a blank state was detected by debug tool 130 in application 111. Stencils state timeline 630 shows, over time, the frequency that a stencil state was detected by debug tool 130 in application 111. Debug tool 130 may include more, or fewer, states in graph 600.

Graph 600 may be a user interface, generated by debug tool 130, and provided to an administrator. Debug tool 130 may output a selectable option to toggle a trend line for any given state on or off. Debug tool 130 may provide an option to the administrator to establish a threshold for a trend line where, if a frequency crosses the threshold for a given state, an alert would be automatically triggered to be provided to the administrator. For example, if content state trend line 610 were to drop below a certain threshold, or stencils state trend line 630 or blank state trend line 620 were to increase above a certain threshold, debug tool 130 would provide the alert to the administrator.

In an embodiment, each of the trend lines of graph 600 are interactive. For example, the administrator may determine that a point in a trend line is a potential time at which a bug in the source code of a host application of application 111 was introduced. Debug tool 130 may detect a selection of that point in the trend line, and may responsively access a log to determine changes to the source code that occurred at, or in the vicinity of, that time. Debug tool 130 may, upon identifying changes to the source code at, or in the vicinity of, that time, output an identifier of the source code changes. In an embodiment, debug tool 130 may provide the administrator with a link to one or more source code changes corresponding to that time. The administrator may thus easily review source code changes that potentially resulted in a bug, and analyze those isolated source code change without having to review myriad changes.

In an embodiment, the alerts provided to the administrator may include a message, such as an email, text message, or push notification addressed to the administrator. The alert may include a description of an issue (e.g., a fault state has been detected; a frequency of times the loading state is detected has increased above the threshold frequency, etc.). The alert may also include links or other identifiers to source code changes corresponding to a time that the alert was triggered.

Figure 7:
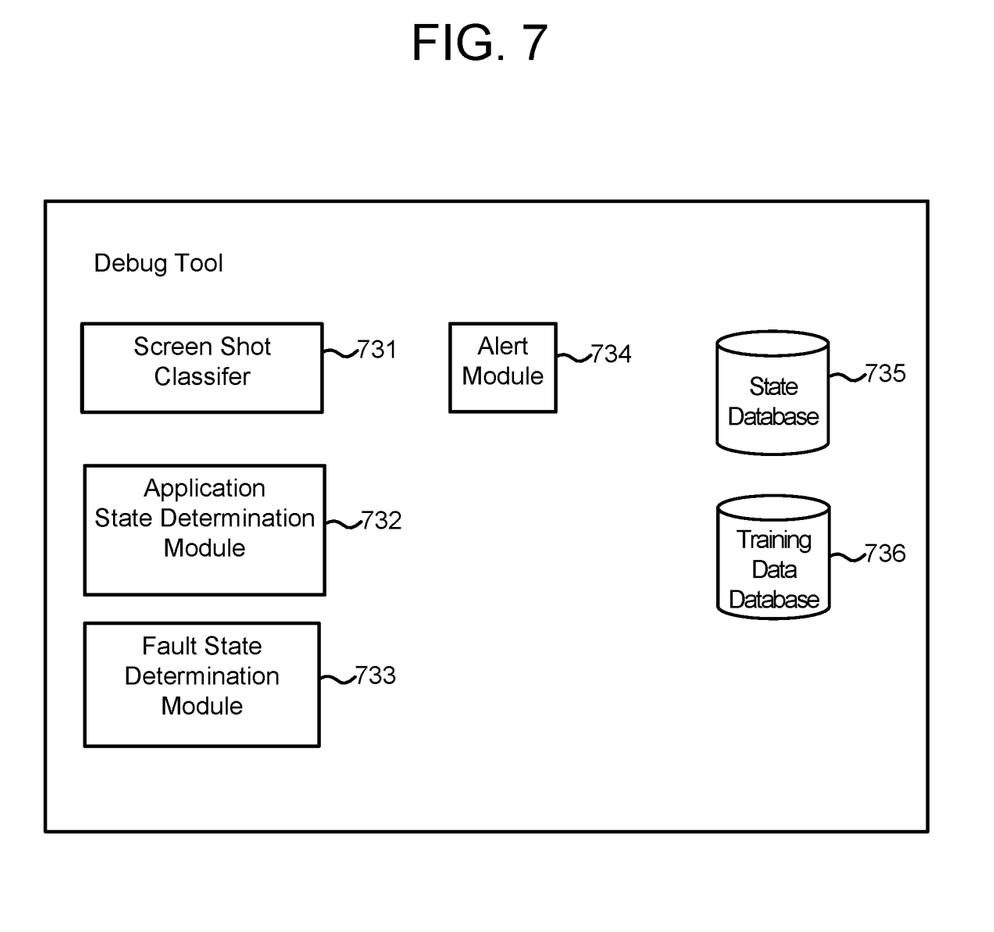
FIG. 7 depicts exemplary modules of a debug tool for use in determining whether an application is in a fault state, in accordance with one embodiment.

FIG. 7 depicts exemplary modules of a debug tool for use in determining whether an application is in a fault state, in accordance with one embodiment. Debug tool 730 corresponds to debug tool 130 and has the same functionality thereof. Debug tool 730 includes screen shot classifier 731, application state determination module 732, fault state determination module 733, alert module 734, state database 735, and training data database 736. Screen shot classifier 731 receives screen shots as input, and provides output to debug tool 730. The output, as discussed in the foregoing, may be a probability that application 111 is in one or more states.

Application state determination module 732 determines the application state (e.g., stencils, content, blank, etc.), as described in the foregoing. Debug tool 130 executes fault state determination module 733 to evaluate whether application 111 is in a fault state (e.g., based on amount of time a given state is detected, parameters of client device 110, parameters of application 112, etc.). Alert module 734 alerts an administrator to existence of a fault state, or any other issue (e.g. as described with respect to FIG. 6). State database 735 stores data structures that define the different states application 111 may take. Training data database 736 may include training data used to train any machine learning model (e.g., screen shot classifier 733) described herein.

The foregoing description of the embodiments of the disclosure may be implemented in debug tool, for providing a user interface for an administrator to identify faulty source code that causes an application to go into a fault state. The foregoing description of embodiments of the disclosure have been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the disclosure should be determined by the appended claims and their legal equivalents. Like reference numerals in different figures carry the same weight and effect of the description of their counterparts in the different figures.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described herein is intended to be illustrative, but not limiting, of the scope of the disclosure, which is set forth in the following claims.

What is claimed is:

1. A computer-implemented method comprising:
capturing screen shots of a screen of an application during operation of the application;
applying a classifier to the captured screen shots;
determining, from output of the classifier, a state of the application, wherein the output of the classifier comprises a respective probability that each of a sequence of captured screen shots corresponds to the application being in a particular state;
detecting a change in the respective probabilities of an earlier sequence of captured screen shots as compared to a later sequence of captured screen shots; and
determining, based on the change, that the later sequence of captured screen shots are not outliers;
evaluating whether the determined state is a fault state of the application; and
responsive to determining that the determined state is a fault state of the application, prompting a user with an alert indicating the fault state and a corresponding point during the operation that exhibited the fault state.

2. The computer-implemented method of claim 1, wherein the application is running on a mobile device.

3. The computer-implemented method of claim 1, wherein source code of the application is not accessible for instrumentation.

4. The computer-implemented method of claim 1, wherein the screen is a window of an application, and the screen shot is an image of the window.

5. The method of claim 1, wherein the classifier is a machine learning model that is trained based on annotated screen shots of the application or based on annotated screen shots of other applications with similar states as the application.

6. The method of claim 1, wherein possible outputs of the classifier include that the screen is displaying content, the screen is displaying stencils, the screen indicates the application is loading, and the screen is a blank screen.

7. The method of claim 1, wherein determining the state of the application comprises determining that the application is either in a non-fault state or in a fault state.

8. The method of claim 1, wherein evaluating whether the determined state is a fault state of the application comprises:
comparing the determined state to a mapping of which possible states are fault states; and
determining, based on said comparison, whether the determined state is a fault state.

9. The method of claim 8, wherein evaluating whether the determined state is a fault state of the application comprises:
determining a parameter of a client device on which the application is operating; and
determining, further based on the parameter, whether the determined state is a fault state.

10. The method of claim 9, wherein the parameter is a network mode; the determined state is a loading state; and the mapping indicates that, when the determined state is a loading state, which network modes are a fault state.

11. The method of claim 1, further comprising:
identifying outlier output based on the respective probabilities; and
disregarding the outlier output in determining the state of the application.

12. The method of claim 11, further comprising applying a low pass filter to the probabilities to identify and disregard the outlier output.

13. The method of claim 1, further comprising determining the state based on the later sequence of captured screen shots.

14. The method of claim 1, wherein prompting the user with the alert comprises transmitting a notification to the user when the determined state is evaluated to be a fault state.

15. The method of claim 1, wherein prompting the user comprises generating for display a graph indicating a degree to which the application is in a given state at various times.

16. The method of claim 15, wherein prompting the user with the alert comprises embedding the alert in the graph at a point in the graph corresponding to the point during the operation that exhibited the fault state.

17. A non-transitory computer-readable medium comprising memory with instructions encoded thereon, the instructions, when executed, causing one or more processors to perform operations, the instructions comprising instructions to:
capture screen shots of a screen of an application during operation of the application;
apply a classifier to the captured screen shots;
determine, from output of the classifier, a state of the application, wherein the output of the classifier comprises a respective probability that each of a sequence of captured screen shots corresponds to the application being in a particular state;
detect a change in the respective probabilities of an earlier sequence of captured screen shots as compared to a later sequence of captured screen shots;
determine, based on the change, that the later sequence of captured screen shots are not outliers;
evaluate whether the determined state is a fault state of the application; and
responsive to determining that the determined state is a fault state of the application, prompt a user with an alert indicating the fault state and a corresponding point during the operation that exhibited the fault state.

18. A system comprising:
a non-transitory medium comprising memory with instructions encoded thereon; and
one or more processors configured to, when executing the instructions, perform operations including:
capturing screen shots of a screen of an application during operation of the application;
applying a classifier to the captured screen shots;
determining, from output of the classifier, a state of the application, wherein the output of the classifier comprises a respective probability that each of a sequence of captured screen shots corresponds to the application being in a particular state;
detecting a change in the respective probabilities of an earlier sequence of captured screen shots as compared to a later sequence of captured screen shots;
determining, based on the change, that the later sequence of captured screen shots are not outliers;
evaluating whether the determined state is a fault state of the application; and
responsive to determining that the determined state is a fault state of the application, prompting a user with an alert indicating the fault state and a corresponding point during the operation that exhibited the fault state.

* * * * *